Dec. 17, 1935.  R. G. BARTLETT  2,024,267
TRUCK
Filed Aug. 10, 1934  3 Sheets-Sheet 1
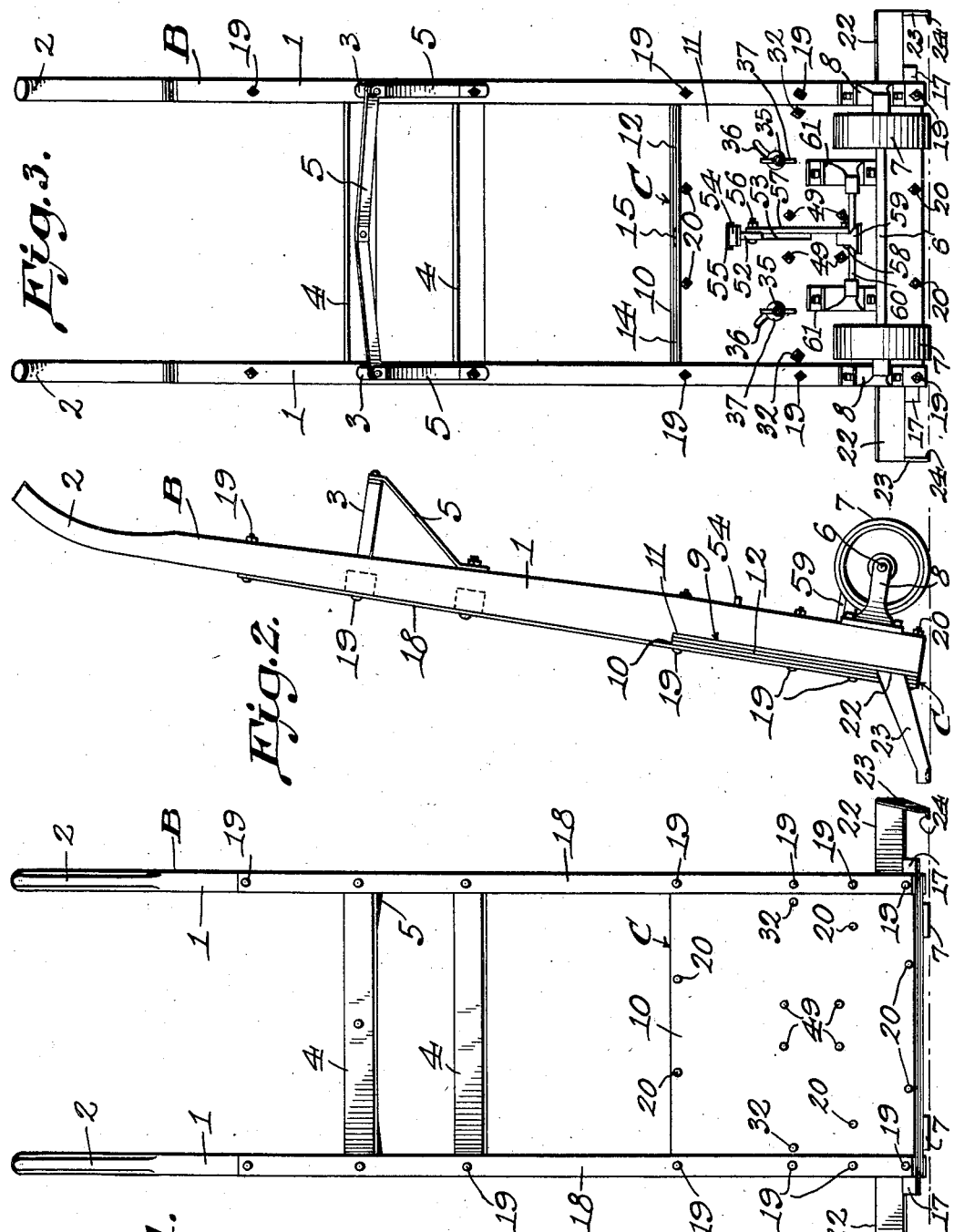

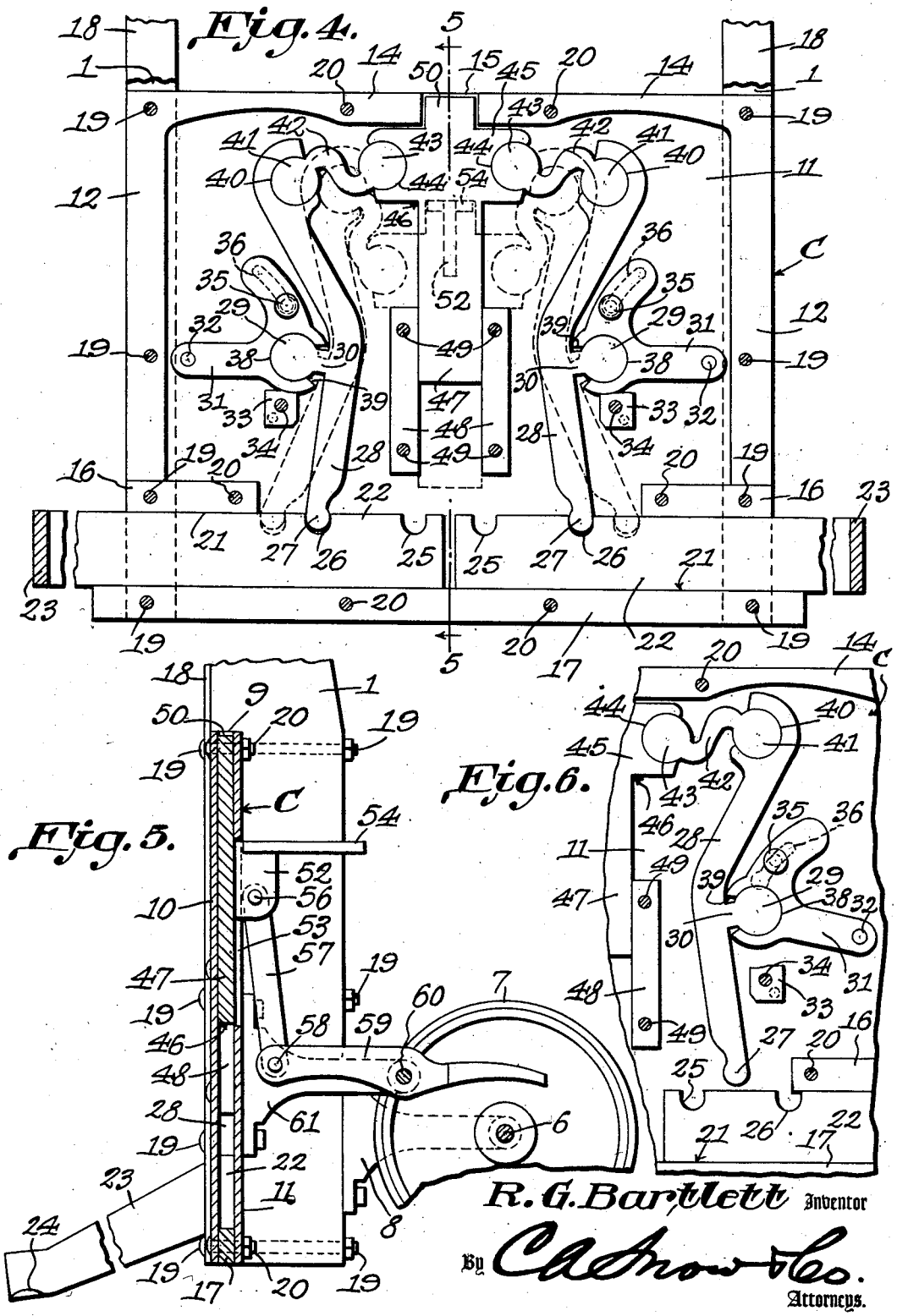

Dec. 17, 1935.  R. G. BARTLETT  2,024,267
TRUCK
Filed Aug. 10, 1934   3 Sheets-Sheet 3

R. G. Bartlett Inventor
By C. A. Snow & Co.
Attorneys.

Patented Dec. 17, 1935

2,024,267

UNITED STATES PATENT OFFICE 2,024,267

TRUCK

Ralph Gilbert Bartlett, Lake Alfred, Fla.

Application August 10, 1934, Serial No. 739,310

8 Claims. (Cl. 214—65.5)

The device forming the subject matter of this application is a hand truck, adapted to transport fruit boxes, but not confined to that use. The objects of the invention are to house the working parts, accommodate boxes of different widths, resist wear, provide a novel actuating mechanism and supply a novel casing structure wherein the working parts are enclosed. Other advantages will develop as the description proceeds.

A preferred form has been shown in the drawings and will be described hereinafter: but it will be understood that a mechanic, working within the scope of what is claimed, may make such changes as his skill may direct. Those changes will not in anywise constitute a departure from the spirit of the invention.

In the accompanying drawings:

Fig. 1 shows, in front elevation, a hand truck constructed in accordance with the invention;

Fig. 2 is a side elevation of the truck;

Fig. 3 is a rear elevation of the truck;

Fig. 4 is a front elevation of the casing which carries the working parts, the front plate having been removed, parts being broken away, and parts appear in section;

Fig. 5 is a section on the line 5—5 of Fig. 4, parts being broken away;

Fig. 6 is a view like Fig. 4, but illustrating the step by which the levers are shifted to assume a new operative position with respect to the box grips;

Figure 7:
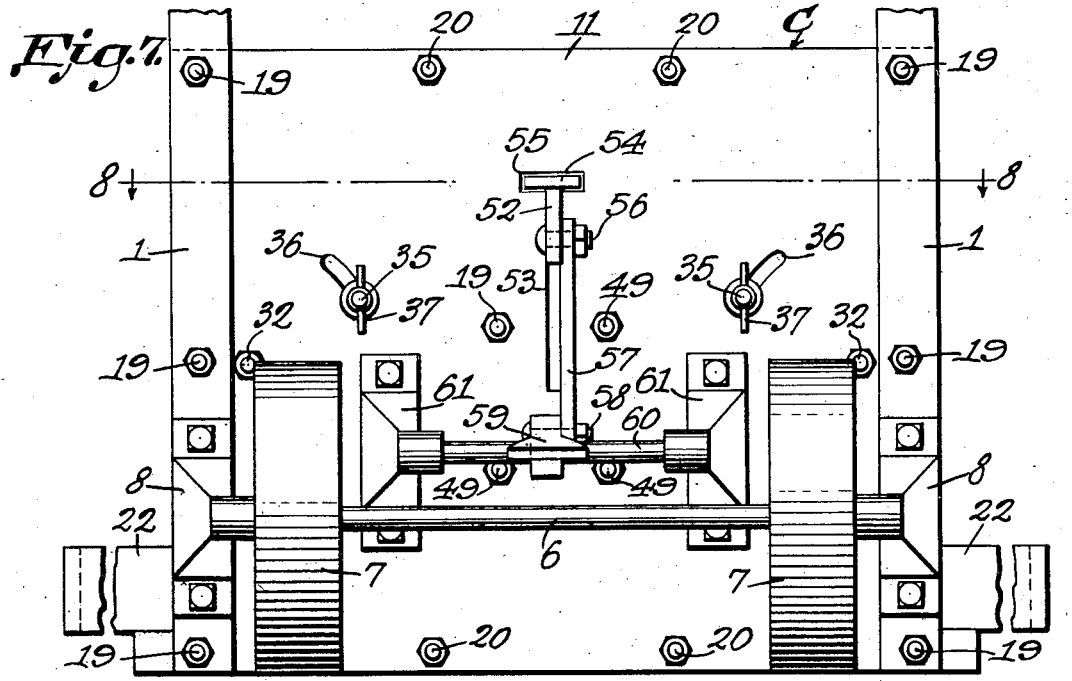
Fig. 7 is a rear elevation of the lower portion of the truck, this view being an enlargement of the lower part of Fig. 3.

Referring to Figs. 1, 2 and 3, the truck comprises a body B, including side rails 1, terminating at their upper ends in handles 2. The truck legs 3, and the connecting members 4 which join the side rails 1 together, may be of standard form, and bracing may be used at 5, or wherever necessary, to sustain the truck legs 3 and one or more of the connecting members 4. A transverse shaft 6 carries the supporting wheels 7 of the truck, and the shaft is mounted in brackets 8 secured to the rear edges of the side rails 1, near to the lower ends thereof.

In the forward edges of the side rails 1, at the lower end of truck body B, there are recesses 9, seen best in Figs. 2 and 5. In the recesses 9, a casing C, preferably made of metal, is mounted. The casing C comprises a front plate 10 and a back plate 11, which are disposed a little way apart, as Fig. 8 will show. Spacers 12 (Fig. 4) are interposed between the front plate 10 and the back plate 11 at the outer vertical edges thereof. At their upper ends, the spacers 12 have inwardly extended projections 14 located at the top of the casing C. There is an opening 15 between the inner ends of the projections 14. Transverse, inwardly projecting guides 16 (Fig. 4) are located between the casing plates 10 and 11, at the lower ends of the spacers 12. A guide 17 extends entirely across the lower end of the casing C, between the plates 10 and 11, and the ends of the guide 17 project outwardly beyond the sides of the truck body B. The guides 16 and the guide 17 form a transverse guideway 21 at the lower end of the casing C. It is shown in Figs. 2 and 5 that wear strips 18 extend downwardly along the forward edges of the side rails 1 of the truck body B. The wear strips 18 are secured to the side rails 1 by attaching elements 19, some of which (Fig. 4) pass through the casing plates 10 and 11, the spacers 12, the guides 16 and the guide 17, to secure the casing C in the recesses 9 of the side rails 1. Additional securing elements 20 pass through the casing plates 10 and 11, the projections 14 of the spacers 12, the guides 16, and the guide 17. It may be observed at this place that, as shown in Fig. 4, the casing C is closed at its sides by the spacers 12, at its bottom by the long guide 17, and at its top the casing is substantially closed by the projections 14 of the spacers 12. The result is that it will be practically impossible for dirt to get into the casing C to a degree sufficient to interfere with the operation of working parts to be described hereinafter, and the working parts are shielded from blows.

Figure 8:
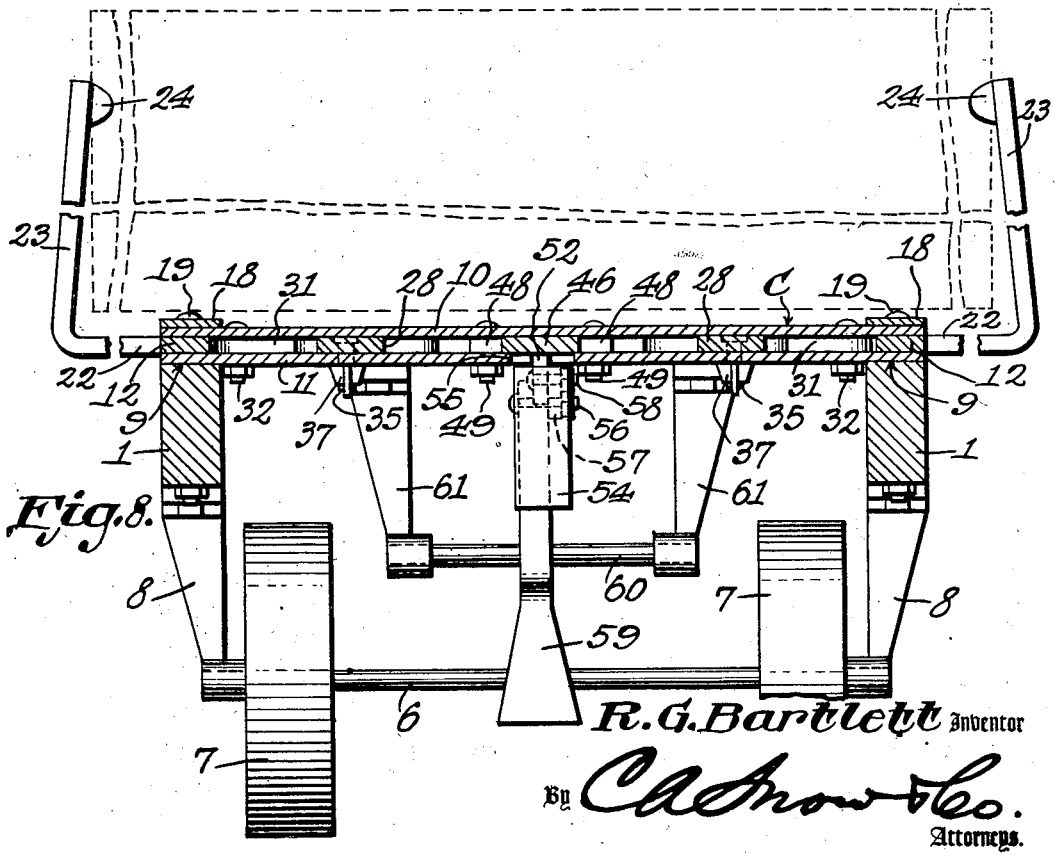
Fig. 8 is a section on the line 8—8 of Fig. 7.

The working parts above alluded to include grips 22, which have in and out transverse sliding movement in the guideway 21 formed by the members 16 and 17 of Fig. 4. The grips 22 extend outwardly beyond the sides of the truck body B (Fig. 1) and at their ends they are provided with forwardly presented arms 23 which slant downwardly (Fig. 5) and inwardly (Fig. 8). At their forward ends, the arms 23 have inwardly extended fingers 24. Referring again to Fig. 4, the reader will note that there are inner seats or notches 25 and outer seats or notches 26 in the upper edges of the grips 22. In either the outer seats 26 or the inner seats 25 may be mounted disk-like heads 27 at the lower ends of upwardly-extended levers 28, disposed between the casing plates 10 and 11. Without going further into the description of the operating mechanism at this point, it may be set forth that the head and seat construction shown at 27—26 is used throughout the entire device, rather than bolts or the like, which are commonly employed for affording pivotal connections between relatively movable parts. The result is that the working parts are easily assembled, characterized by great strength, and well adapted to withstand the severe use to which they are subjected.

The upwardly-extended levers 28 of Fig. 4 are of obtusely angular form, their intermediate portions being nearest to the longitudinal central line of the casing C, represented by the line 5—5 of Fig. 4. The intermediate portions of the levers 28 have outwardly and laterally projecting disk-like bearings 29, connected to the intermediate portions of the lever by reduced necks 30. Adjustable fulcrum members 31 for the levers 28 are provided and are located between the casing plates 10 and 11. The fulcrum members 31 are connected by pivot elements 32, at their outer ends, to the casing plates 10 and 11 for swinging adjustment. The fulcrum members 31, however, are fixed, in the ordinary operation of the device, and this is so because their inner ends rest against stops 33, secured at 34 between the casing plates 10 and 11. The fulcrum members 31 can be held in engagement with the stops 33, through the instrumentality of studs 35 on the fulcrum members, the studs extending backwardly through arcuate slots 36 (Fig. 7) in the plate 11, wing nuts 37 being threaded on the studs 35, the wing nuts being adapted to engage the plate 11. The fulcrum members 31 are supplied with circular seats 38 having mouths 39 that open through the inner edges of the fulcrum members. The necks 30 on the levers 28 are received in the mouths 39 and have movement therein, the bearings 29 being received in the seats 38. Thus, the levers 28 are fulcrumed intermediate their ends by a construction which has the advantages of the pivotal connection shown at 26—27 in Fig. 4, those advantages having been alluded to hereinbefore.

The description of the mechanism may be suspended profitably here, in order to explain why it is desirable to have the adjustable fulcrum members 31. As the grips 22 are slid in or out by means of the levers 28, the arms 23 of the grips engage the sides of the box that is to be transported, the fingers 24 being received beneath the box. The boxes are not always of the same width, and when a wider box is to be handled, the wing nuts 37 are loosened, and by means of the wing nuts and the studs 35, the fulcrum members 31 can be swung upwardly (Fig. 6), the studs 35 moving in the arcuate slots 36 (Fig. 7) of the back plate 11. This operation raises the levers 28 to the position of Fig. 6, the heads 27 on the lower ends of the levers being disengaged from the inner seats 25 of the grips 22. The grips 22 then can be slid outwardly from the position of Fig. 4, the fulcrum members 31 and the levers 28 being swung down again, and the heads 27 on the levers 28 being engaged with the inner seats 25 of the grips 22. The wing nuts 37 on the studs 35 of the fulcrum members 31 may be tightened against the back plate 11 of the casing C, and thus the truck is adapted to handle the wider boxes.

The levers 28 are supplied (Fig. 4) at their upper ends with inwardly opening circular seats 40 which receive, pivotally, disk-like heads 41 on the outer ends of sigmoidal links 42, provided at their inner ends with disk-like heads 43, received pivotally in correspondingly shaped seats or bearings 44, formed in the cross arm 45 of a cruciform slide 46 which, like the other working parts hereinbefore described, is located between the plates 10 and 11 of the casing C. The elements 43—44 and 41—40 have the advantages ascribed hereinbefore to the parts 26—27 and to the parts 38—29. The body 47 of the slide 46 reciprocates between two guides 48, secured at 49 between the casing plates 10 and 11. The upper extremity 50 of the slide 46 is adapted to be received in the opening 15 (Fig. 4) which exists between the inner ends of the projections 14 of the spacers 12.

Figure 5 shows that the slide 46 carries a rearwardly projecting vertical bracket 52, received for sliding movement in a slot 53 in the back plate 11 of the casing C. On the upper end of the bracket 52 there is a rearwardly projecting foot piece 54. The slot 53 has a transverse extension 55 at its upper end, and this extension is shown in Fig. 7. The extension 55 comes into play only in the assembling of the device. The reason for having the slot extension 55 is to enable the foot piece 54 to be slid backwardly through the plate 11, in assembly, an operation which will be understood readily when Figs. 5 and 7 are compared.

The numeral 56 marks a pivot element which connects the upper end of a link 57 with the bracket 52 on the slide 46, the lower end of the link 57 being connected by a pivot element 58 with a pedal or lever of the first order, designated by the numeral 59. The pedal lever 59 is fulcrumed intermediate its ends on a rod 60 carried by two rearwardly projecting supports 61 (Figs. 5, 7 and 3) which are secured to the back plate 11 of the casing C.

The general operation of the device is very simple. Place the foot on the foot piece 54 of Figs. 5, 7, 8 and 3, and shove down. The bracket 52 carries the slide 46 (Fig. 4) down. The links 42 swing the upper ends of the levers 28 inwardly, and the lower ends of the levers 28 are swung outwardly. The levers 28 carry the grips 22 outwardly and space the arms 23 of the grips apart so that the lowermost box in a vertical pile can be received between them. Then press downwardly on the outer end of the pedal 59 (Fig. 5). The link 57 raises the slide 46 to the position of Fig. 4, the links 52 tilt the levers 28, the upper ends of the levers moving outwardly, and the lower ends of the levers 28 moving inwardly. The levers 28 move the grips 22 inwardly, the arms 23 and the fingers 24 of the grips 22 engage the lowermost box in a vertical stack, the truck body B is tilted backwardly on the wheels 7, and the load is trundled away.

The working parts are fully enclosed, thereby protecting them from dirt and damaging blows, and giving the device long life. The disk and socket construction shown, for instance, at 29—28, is simple, easily assembled, strong, and adapted to resist wear. The guides 16 and 17 of Fig. 4 take all the strain off the working parts that are above them. The fulcrum members 31 may be adjusted as shown in Figs. 4 and 6, for the purpose hereinbefore set forth. The clamping pressure on the box is kept constant, even though boxes of different sizes are handled.

Other advantages occur in practical use, and will be understood readily by those accustomed to use hand trucks, or concerned in their manufacture.

What is claimed is:

1. A hand truck comprising a body, oppositely-disposed box grips mounted to reciprocate on the body, operating means for the box grips, comprising spaced levers, a slide mounted to reciprocate on the body, between the levers, means under the control of an operator for actuating the slide, links extended between the upper ends of the levers and the slide, pivotal connections between the inner ends of the links and the slide, pivotal connections between the outer ends of the links and the upper ends of the levers, pivotal connections between the lower ends of the levers and the box grips, fulcra for the levers and carried by the body, each of the pivotal connections, and each fulcrum, comprising a disk-like head and a seat receiving the head, oppositely-disposed members located on opposite sides of the heads and the seats, the oppositely-disposed members constituting means for holding the heads pivotally assembled with the seats and constituting also a housing wherein the operating means is enclosed.

2. A hand truck comprising a body, box grips movable on the body and having a pair of inner seats and a pair of outer seats, levers detachably engageable with the seats of either pair, means under the control of an operator for actuating the levers, fulcra for the levers, and means for supporting the fulcra adjustably on the body, whereby the levers may be disengaged from the seats of one pair and be engaged with the seats of the other pair.

3. A hand truck comprising a body, box grips movable on the body and having a pair of inner seats and a pair of outer seats, levers detachably engageable with the seats of either pair, means under the control of an operator for actuating the levers, fulcra for the levers, means for mounting the fulcra on the body for swinging adjustment, whereby the levers may be disengaged from the seats of one pair and be engaged with the seats of the other pair, and means for holding the fulcra against swinging movement, at the will of an operator.

4. A hand truck comprising a body, box grips mounted on the body and having a pair of inner seats and a pair of outer seats, levers detachably engageable at one end with the seats of either pair, a slide mounted to reciprocate on the body, between the levers, means under the control of an operator for actuating the slide, links having their inner ends pivoted to the slide and having their outer ends pivoted to the opposite ends of the levers, fulcra pivotally connected with the intermediate portions of the levers, means for mounting the fulcra movably on the body, to permit the levers to be disengaged from the seats of one pair and be engaged with the seats of the other pair, and means for holding the fulcra releasably against movement.

5. A hand truck comprising a body, oppositely-disposed box-grips movably mounted on the body, operating means for the box-grips, comprising spaced levers, means under the control of an operator for actuating the levers, fulcra for the levers, pivotal connections between the levers and the box-grips, the pivotal connections comprising disk-like heads and seats receiving the heads, and oppositely-disposed members forming part of the body and located on opposite sides of the heads and the seats, the oppositely-disposed members constituting means for holding the heads pivotally assembled with the seats and constituting also a housing wherein the operating means is enclosed.

6. A hand truck comprising a body, oppositely-disposed box-grips movably mounted on the body, operating means for the box-grips, comprising spaced levers, means under the control of an operator for actuating the levers, fulcra for the levers, comprising disk-like heads and seats receiving the heads, pivotal connections between the levers and the box-grips, and oppositely-disposed members forming part of the body and located on opposite sides of the heads and the seats, the oppositely-disposed members constituting means for holding the heads pivotally assembled with the seats and constituting also a housing wherein the operating means is enclosed.

7. In a hand truck comprising a body, oppositely-disposed box-grips movably mounted on the body, operating means for the box-grips, comprising levers and fulcra therefor, a slide mounted to move on the body between the levers, means under the control of an operator for actuating the slide, links having their outer ends pivoted to the levers, pivotal connections between the inner ends of the links and the slide, the pivotal connections comprising heads and seats receiving the heads, pivotal connections between the levers and the box-grips, and oppositely-disposed members forming part of the body and located on opposite sides of the seats and the heads, the oppositely-disposed members constituting means for holding the heads pivotally assembled with the seats and constituting also a housing wherein the operating means is enclosed.

8. A hand truck comprising a body, oppositely-disposed box-grips movably mounted on the body, operating means for the box-grips, comprising levers and fulcra therefor, a slide mounted to move on the body, between the levers, means under the control of an operator for actuating the slide, links having their inner ends pivoted to the slide, pivotal connections between the outer ends of the links and the levers, the pivotal connections comprising heads and seats receiving the heads, pivotal connections between the levers and the box-grips, and oppositely-disposed members forming part of the body and located on opposite sides of the seats and the heads, the oppositely-disposed members constituting means for holding the heads pivotally assembled with the seats and constituting also a housing wherein the operating means is enclosed.

RALPH GILBERT BARTLETT.